(12) United States Patent
Mallet et al.

(10) Patent No.: US 12,230,801 B2
(45) Date of Patent: Feb. 18, 2025

(54) ELECTRODE MATERIALS AND PROCESSES FOR THEIR PREPARATION

(71) Applicants: HYDRO-QUÉBEC, Montréal (CA); MURATA MANUFACTURING CO., LTD., Nagaokakyo (JP)

(72) Inventors: Charlotte Mallet, Montréal (CA); Serge Verreault, Saint-Tite (CA); Josée Pronovost, Trois-Rivières (CA); Sylviane Rochon, Saint-Adélphe (CA); Jean-Christophe Daigle, St-Bruno-de-Montarville (CA); Kamyab Amouzegar, Mont-Royal (CA); Karim Zaghib, Longueuil (CA)

(73) Assignees: HYDRO-QUÉBEC, Montréal (CA); MURATA MANUFACTURING CO., LTD., Nagaokakyo (JP)

( * ) Notice: Subject to any disclaimer, the term of this patent is extended or adjusted under 35 U.S.C. 154(b) by 1040 days.

(21) Appl. No.: 17/265,053

(22) PCT Filed: Aug. 15, 2019

(86) PCT No.: PCT/CA2019/051111
§ 371 (c)(1),
(2) Date: Jul. 13, 2021

(87) PCT Pub. No.: WO2020/034036
PCT Pub. Date: Feb. 20, 2020

(65) Prior Publication Data
US 2022/0069308 A1 Mar. 3, 2022

Related U.S. Application Data

(60) Provisional application No. 62/764,663, filed on Aug. 15, 2018.

(51) Int. Cl.
| | |
|---|---|
| *H01M 4/60* | (2006.01) |
| *H01M 4/04* | (2006.01) |
| *H01M 4/139* | (2010.01) |
| *H01M 4/36* | (2006.01) |
| *H01M 4/66* | (2006.01) |
| *H01M 10/0525* | (2010.01) |
| *H01M 10/0565* | (2010.01) |

(52) U.S. Cl.
CPC .......... *H01M 4/60* (2013.01); *H01M 4/0404* (2013.01); *H01M 4/139* (2013.01); *H01M 4/366* (2013.01); *H01M 4/661* (2013.01); *H01M 10/0525* (2013.01); *H01M 10/0565* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

| | | | |
|---|---|---|---|
| 2,665,323 A | 1/1954 | McFarlane et al. | |
| 5,558,961 A * | 9/1996 | Doeff | C01G 49/0072 429/224 |
| 6,124,061 A * | 9/2000 | Hamano | H01M 50/46 429/316 |
| 2001/0041289 A1 * | 11/2001 | Hikmet | H01M 10/052 429/246 |
| 2002/0015894 A1 * | 2/2002 | Wariishi | C08F 246/00 526/90 |
| 2002/0192559 A1 * | 12/2002 | Yoshimura | H01M 50/562 429/231.1 |
| 2005/0234177 A1 | 10/2005 | Zaghib et al. | |
| 2007/0111105 A1 | 5/2007 | Zaghib et al. | |
| 2009/0038676 A1 | 2/2009 | Monden et al. | |
| 2011/0159360 A1 | 6/2011 | Hirota et al. | |
| 2011/0255214 A1 * | 10/2011 | Gruner | H01G 11/46 977/948 |
| 2015/0118559 A1 | 4/2015 | Ito et al. | |
| 2015/0146346 A1 * | 5/2015 | Shimomura | H01M 4/364 29/25.03 |
| 2016/0351973 A1 | 12/2016 | Albano et al. | |
| 2017/0179491 A1 | 6/2017 | Zaghib et al. | |
| 2017/0271677 A1 | 9/2017 | Lecuyer et al. | |
| 2017/0317379 A1 * | 11/2017 | Fukuta | H01M 10/0525 |

FOREIGN PATENT DOCUMENTS

| | | | |
|---|---|---|---|
| CN | 105206838 A | | 12/2015 |
| CN | 108183202 A | * | 6/2018 |
| EP | 1975952 A2 | | 10/2008 |
| EP | 2876709 A1 | | 5/2015 |
| JP | 2008-084786 A | | 4/2008 |

(Continued)

OTHER PUBLICATIONS

Machine translation of CN 108183202, published on Jun. 19, 2018 (Year: 2018).*
Extended European Search Report dated Apr. 21, 2022, issued by the European Patent Office in corresponding European Application No. 19850213.0-1108, (11 pages).
Office Action in Japanese Application No. 2021-507451 dated Jul. 7, 2023.
Bailey, J.E. et al."Synthesis and Purification of Trisulphoindigo and Reversed-Phase High Performance Liquid Chromatographic Determination of Trisulphoindigo in FD & C Blue No. 2" Dyes and Pigments, 1985, vol. 6, No. 2, pp. 135-154.
Baltac, T. et al., The Synthesis of Some Food Dyes for Natural and Synthetic FibresRevista de Chimie, 2012, vol. 63, No. 6, pp. 618-620.
Häupler, B. et al.,"Carbonyls: Powerful Organic Materials for Secondsry Batteries" Adv. Energy Mater., 2015, vol. 5, 1402034, 34 pages).

(Continued)

*Primary Examiner* — Anca Eoff
(74) *Attorney, Agent, or Firm* — Womble Bond Dickinson (US) LLP (57) ABSTRACT

Here is described an electrode material comprising an electrochemically active metallic film and an organic compound, e.g. an indigoid compound (indigo blue or a derivative or precursor thereof). Processes for the preparation of the electrode material and electrodes containing the material, as well as to the electrochemical cells and their use are also contemplated.

32 Claims, 6 Drawing Sheets

(56) References Cited

FOREIGN PATENT DOCUMENTS

| JP | 2011-103260 | | 5/2011 |
|---|---|---|---|
| JP | 2011-103260 | A | 5/2011 |
| JP | 2013-025949 | A | 2/2013 |
| WO | 2003/063287 | A2 | 7/2003 |
| WO | 2004/068610 | A2 | 8/2004 |
| WO | 2009/111860 | A1 | 9/2009 |
| WO | 2016/087759 | A1 | 6/2016 |

OTHER PUBLICATIONS

Horn, R.H., et al.,"Notes." Journal of the Chemical Society (Resumed), 1950, pp. 2900-2908.

Karapetyan G. et al.,"Synthesis and Bioactivity of Carbohydrate Derivatives of Indigo, Its Isomers and Heteroanalogues" Chem, Med. Chem., 2011, vol. 6, pp. 25-37.

Klimovich I.V.,"Design of indigo derivatives as environment-friendly organic semiconductors for sustainable organic electronics" Journal of Materials Chemistry CJ. Mat. Chem., 2014, vol. 2, pp. 7621-7631.

Leclerc, S., et al.,"Indirubins Inhibit Glycogen Synthase Kinase-3b and CDK5/P25, Two Protein Kinases Involved in Abnormal Tau Phosphorylation in Alzheimer's Disease" J. Biol. Chem., 2001, vol. 276, No. 1, pp. 251-260.

Liang, Y. et al., "Organic Electrode Materials for Rechargeable Lithium Batteries" Adv. Energy Mater., 2012, vol. 2, pp. 742-769.

Paolella A. et al.,"Light-assisted delithiation of lithium iron phosphate nanocrystals towards photo-rechargeable lithium on batteries" Nature Communications, 2017, vol. 8, pp. 1-10.

Tanoue et al.,"A facile synthesis of 6,60- and 5,50- dihalogenoindigos" Dyes and Pigments, vol. 62, 2004, pp. 101-105.

Tsao, Y. et al.,"Enhanced Cycling Stability of Sulfur Electrodes through Effective Binding of PyridineFunctionalized Polymer" ACS Energy Lett., 2017, vol. 2, pp. 2454-2462.

Voß, G. et al."Regioselektiver BromlLithium-Austausch bei 2,5-Dibrom-I-nitrobenzol.—Eine einfache Synthese von 4—Brom-2-nitrobenzaldehyd und 6,6'-Dibromindigo", Chemische Berichte, 1989, vol. 122, No. 6, pp. 1199-1201.

International Search Report (PCT/ISA/210) issued on Oct. 25, 2019, by the Canadian Intellectual Property Office as the International Searching Authority for International Application No. PCT/CA2019/051111.

Written Opinion (PCT/ISA/237) issued on Oct. 25, 2019, by the Canadian Intellectual Property Office as the International Searching Authority for International Application No. PCT/CA2019/051111.

Zhang, W. et al., "A theoretical method to predict novel organic electrode materials for Na-ion batteries", Computational Materials Science, vol. 134, pp. 42-47, 2017.

Yao, M. et al., "Indigo carmine: An organic crystal as a positive-electrode material for rechargeable sodium batteries", Scientific Reports, 4, 3650, pp. 1-6, 2014.

Yao, M. et al., "Indigo Dye as a Positive-electrode Material for Rechargeable Lithium Batteries", Chem. Lett., 39, pp. 950-952, 2010.

* cited by examiner

ELECTRODE MATERIALS AND PROCESSES FOR THEIR PREPARATION

CROSS-REFERENCE TO RELATED APPLICATIONS

This application is a U.S. National Phase Under 35 U.S.C. § 371 of International Application No. PCT/CA2019/051111, titled "ELECTRODE MATERIALS AND PROCESSES FOR THEIR PREPARATION." filed on Aug. 15, 2019, which claims priority under applicable law to U.S. provisional application No. 62/764,663 filed on Aug. 15, 2018, the contents of which are incorporated herein by reference in their entireties for all purposes.

TECHNICAL FIELD

The technical field generally relates to electrode materials and processes for their preparation, for instance, electrode materials comprising an electrochemically active metallic material and an organic additive. The present technology also relates to electrodes and their use in electrochemical cells.

BACKGROUND

The use of lithium or lithium-ion batteries which include a metallic lithium electrode is often limited due to capacity loss resulting from the formation of lithium dendrites through the electrolyte and separator. The use of metallic lithium anodes thus generally requires a solid electrolyte to prevent such dendrite formation. However, a solid electrolyte interface (SEI) layer will generally form between the solid electrolyte and the metallic anode. This SEI may impair battery performance, for instance, because of its instability or its low conductivity.

Indigo blue is a pigment originally extracted from plants which has been used as a dye for centuries. The molecule itself has been studied for various aspects, including its ambipolar organic semiconductor properties. The indigo blue dye, which is basically insoluble in water, has also been reduced to its colorless and soluble leuco-indigo form (indigo white). This redox property has been more recently studied in electrochemistry. For instance, indigo carmine, an analog of indigo blue, was tested as a purely organic cathode active material in rechargeable batteries (Yao M. et al., *Scientific Reports*, 4, 3650, pages 1-6).

SUMMARY

In one aspect, the present technology relates to an electrode material comprising a film of a metallic material and a compound of any one of Formulae I to IV:

Formula I

Formula II

Formula III

Formula IV wherein,
$R^1, R^2, R^3, R^4, R^5, R^6, R^7$, and $R^8$ are each independently selected from a hydrogen atom, a group selected from halogen (e.g. F, Cl or Br), optionally halogenated alkyl, cycloalkyl, or aryl, CN, $-NO_2$, $-SO_2OM^2$, $-OP(O)(OM^2)_2$, $-P(O)(OM^2)_2$, or $-C(O)OM^2$, wherein $M^2$ is a cation of an alkali or alkaline earth metal, or a $-OC(O)$alkyl, $-SO_2NH_2$, $-SO_2NH$alkyl, or $-SO_2N(alkyl)_2$ group;

$R^{10}$ is a hydrogen atom or a carbohydrate, where the carbohydrate is a natural or synthetic carbohydrate (e.g. mono or disaccharide, oligo and polysaccharides, e.g. β-D-glucose or cellulose);

$X^1$ is, independently in each occurrence, selected from O, S, NH, $NR^9$, and PH, wherein $R^9$ is selected from natural or synthetic carbohydrate and protective groups, for instance an amine protective group such as trifluoroacetamide, t-butyloxycarbonyl (Boc), benzyloxycarbonyl (Cbz), 9-fluorenylmethyloxycarbonyl (Fmoc), benzyl (Bn), and the like; and i. a, c and e are single bonds, b and d are double bonds, $X^2$ is O, and $M^1$ is H or a cation of an alkali or alkaline earth metal ion forming a salt with $X^2$ (e.g. $M^1$ is $Li^+$, $Na^+$, $K^+$, $Ca^{2+}$, or $Mg^{2+}$) wherein the ratio of cation to the rest of the compound of Formula I provides electroneutrality (e.g. $M^1$ may be $Li^+$ or $(Mg^{2+})_{1/2}$); or ii. a, c and e are double bonds, b and d are single bonds, $X^2$ is O or NOH (oxime), and $M^1$ is absent;

a geometric isomer (e.g. cis or trans) of a compound of Formula I, II or III, or a tautomer, oxidized form or salt of a compound of Formula IV;

or a carbohydrate (mono or disaccharide, oligo and polysaccharides, e.g. β-D-glucose or cellulose) complex or conjugate thereof.

In one embodiment, $X^1$ is O, S or NH, for instance, $X^1$ is NH.

In one embodiment, the compound is of Formula I as herein defined. In another embodiment, the compound is of Formula II as herein defined. In a further embodiment, the compound is of Formula III as herein defined. In any one of these embodiments, $R^2$ and $R^6$ may be the same and selected from halogen (e.g. F), optionally halogenated alkyl, —CN, and —SO$_2$OM$^2$, e.g. —CN, or $R^3$ and $R^7$ may be the same and selected from halogen (e.g. F), optionally halogenated alkyl, —CN, and —SO$_2$OM$^2$, e.g. —CN, or each of $R^1$ to $R^8$ are hydrogen atoms.

In another embodiment, a, c and e are single bonds, b and d are double bonds, $X^2$ is O, and $M^1$ is H or a cation of an alkali or alkaline earth metal ion forming a salt with $X^2$, for instance $M^1$ is a cation of the same metal as the metal of the film of metallic material. In an alternative embodiment, a, c and e are double bonds, b and d are single bonds, $X^2$ is O, and $M^1$ is absent.

In another embodiment, the compound is of Formula IV, for instance, wherein $R^2$ is selected from halogen (e.g. F), optionally halogenated alkyl, —CN, and —SO$_2$OM$^2$, e.g. $R^2$ is —CN, or wherein each of $R^1$ to $R^4$ are hydrogen atoms. In one embodiment, $R^{10}$ is a hydrogen atom. In another embodiment, $R^{10}$ is a carbohydrate, e.g. β-D-glucose or cellulose.

In one embodiment, the compound is selected from:

Compound 1

Compound 2

Compound 3

Compound 4

Compound 5

Compound 6

Compound 7

Compound 8

Compound 9

Compound 10

Compound 11

Compound 12

-continued

Compound 13

Compound 14

In one embodiment, the compound is indigo blue. In another embodiment, the compound is leuco-indigo or a $M^1$ salt thereof. In another embodiment, the compound is selected from indigo blue, indigo carmine, isoindigo, indigopurpurin and indolinedione. In yet another embodiment, the compound is Compound 6. In a further embodiment, the compound is Compound 7. In another embodiment, the compound is selected from Compounds 8 to 10. In a further embodiment, the compound is selected from Compounds 1, 8, 11, 12, and 14.

According to another embodiment, the metallic film comprised in the electrode material is a film of an alkali or alkaline earth metal, for instance, a film of lithium, a lithium alloy (e.g. Li—Na, Li—Mg, Li—Zn, Li—Al, and the like), sodium, a sodium alloy, magnesium, or a magnesium alloy. In one embodiment, the metallic film is a lithium or lithium alloy film. For example, the lithium alloy film comprises at least 50%, at least 75%, at least 90%, at least 95%, or at least 99% of lithium by weight.

In one embodiment, the metallic film has a thickness between about 5 μm and about 200 μm, or between about 5 μm and about 100 μm, or between about 10 μm and about 50 μm.

In a further embodiment, the electrode material comprises the compound at a concentration of about 2 wt % or less, about 1 wt % or less, or between about 0.0001 wt % and about 1 wt %, or about 0.001% wt % and about 0.5 wt %.

According to another aspect, the present technology relates to a process for producing an electrode material as herein defined, comprising the steps of:
a) mixing the compound in a solvent to obtain a mixture (e.g. solution);
b) applying the mixture obtained in step (a) on a metallic film to form a treated film; and
c) removing the solvent.

In one embodiment, the solvent is an organic aprotic inert solvent, for instance, an alkane solvent, an ether solvent (linear or cyclic), an aromatic solvent, or a combination thereof. In one embodiment, the solvent is an alkane (e.g. hexanes). In another embodiment, the solvent is an ether, for instance a cyclic ether such as tetrahydrofuran.

In another embodiment, the process further comprises a step of washing the film with a washing solvent to remove excess compound, for instance, the washing solvent is the same as the solvent of step (a).

In a further embodiment, step (b) is performed by drop-casting, mold casting, dip coating, spin coating, spray coating, slot die coating, doctor blade coating, printing, chemical vapor deposition, physical vapor deposition, and the like.

According to a further aspect, the present technology relates to a process for producing an electrode material as herein defined, comprising the steps of:
a) mixing the compound in a lubricating agent to obtain a lubricating composition;
b) applying the lubricating composition obtained in step (a) on a metallic foil to form a treated foil; and
c) extruding and/or laminating (between at least two rolls) the treated foil obtained in step (b).

In one embodiment, steps (b) and (c) are carried out simultaneously (or in a substantially simultaneous mode). In another embodiment, the lubricating agent comprises a polymer, optionally together with a solvent. In another embodiment, the lubricating composition comprises a solvent is an organic aprotic inert solvent, for instance, an alkane solvent (e.g. hexane), an ether solvent (e.g. tetrahydrofuran), an aromatic solvent (e.g. toluene) or a combination thereof. In a further embodiment, the process further comprises removing the solvent. In yet another embodiment, the compound is at a concentration of between about 0.001 wt % and about 2 wt % in the lubricating composition, for instance, between about 0.01 wt % and about 2 wt %.

Another process for producing an electrode material as defined herein comprises the steps of:
a) melting an alkali metal or an alloy thereof to obtain a molten metal;
b) mixing the compound with the molten metal, casting and allowing to solidify to form an ingot, wherein said mixing and casting may be carried out in any order; and
c) extruding and/or laminating the ingot obtained in (b) into a film to be used as electrode material.

According to a further aspect, the present technology relates to an electrode comprising an electrode material as defined herein or produced by a process as defined herein, on a current collector. For instance, the current collector is a nickel or copper film.

According to yet another aspect, the present technology relates to an electrochemical cell comprising an electrode containing an electrode material as defined herein or produced by a process as defined herein, an electrolyte and a counter-electrode (an electrode of opposing electrochemical activity).

In a further aspect, the present technology relates to a battery comprising at least one electrochemical cell as herein defined, e.g. a lithium battery.

According to a further aspect, the present technology also further relates the use of the present electrochemical cells and electrodes, for example, in electric or hybrid vehicles, or in ubiquitous IT devices, and as supercapacitors, for instance, the use is in mobile devices, such as mobile phones, cameras, tablets or laptops, in electric or hybrid vehicles, or in renewable energy storage.

Other features and advantages of the present technology will be better understood upon reading of the description herein below with reference to the appended drawings.

DETAILED DESCRIPTION

All technical and scientific terms and expressions used herein have the same definitions as those commonly understood by the person skilled in the art relating to the present technology. The definition of some terms and expressions used herein is nevertheless provided below for clarity purposes.

When the term "approximately" or its equivalent term "about" are used herein, it means approximately or in the region of, and around. When the terms "approximately" or "about" are used in relation to a numerical value, it modifies it; for example, it could mean above and below its nominal value by a variation of 10%. This term may also take into account the probability of random errors in experimental measurements or rounding.

The chemical structures described herein are drawn according to conventional standards. Also, when an atom, such as a carbon atom as drawn, seems to include an incomplete valency, then the valency is assumed to be satisfied by one or more hydrogen atoms even if they are not necessarily explicitly drawn.

The term "alkyl" as used herein refers to saturated hydrocarbons having from one to twelve carbon atoms, including linear or branched alkyl groups. Examples of alkyl groups include, without limitation, methyl, ethyl, propyl, butyl, pentyl, hexyl, isopropyl, tert-butyl, sec-butyl, isobutyl, and the like. When the alkyl group is located between two functional groups, then the term "alkyl" also encompasses alkylene groups such as methylene, ethylene, propylene, and the like. The term "lower alkyl" designates an alkyl group having from 1 to 6 carbon atoms.

The expression "aryl" or "aromatic" is intended to include delocalized conjugated π systems including a number of π delocalized electrons that is equal to 4n+2 π-electrons. The contributing atoms may be arranged in one or more rings. Representative aromatic groups include five and six-membered carbon single rings. The aromatic group may include one or a plurality of fused benzene rings; for example, benzene, naphthalene, anthracene, and the like. The expression "aromatic group" also comprises aromatic groups comprising one or more heteroatoms such as sulfur, oxygen and nitrogen atoms. These aromatic groups having at least one heteroatom may also be referred to as "heteroaromatic" or "heteroaryl" groups. The aromatic ring may be further substituted at one or more ring positions with, for example, a hydroxyl, an amine or the like.

The term "cycloalkyl" as used herein refers to a group comprising saturated or partially unsaturated (non aromatic) carbocyclic ring(s) in a monocyclic or polycyclic system, including spiro (sharing one atom) or fused (sharing at least one bond) carbocyclic ring systems, having from three to fifteen ring members. Examples of cycloalkyl groups include, without limitation, cyclopropyl, cyclobutyl, cyclopentyl, cyclopentene-1-yl, cyclopentene-2-yl, cyclopentene-3-yl, cyclohexyl, cyclohexene-1-yl, cyclohexene-2-yl, cyclohexene-3-yl, cycloheptyl, bicyclo[4,3,0]nonanyl, norbornyl, and the like.

This technology relates to a process for the preparation of an electrode material containing a metallic active material and an organic compound such as an indigoid or a precursor thereof, and to electrodes obtainable or obtained by such a process and to their uses.

Indigoids and precursors such as those used herein may store and release ions during redox reactions. Organic molecules generally have weak Van der Waals type or π-π type interactions while inorganic molecules possess strong interactions like 3D electrostatic interactions. The difference in properties results in the organic molecules being more flexible than inorganic molecules, thereby favoring electrochemical storage of lithium ions or larger charge carriers like $Na^+$ ions. Furthermore, physicochemical properties of organic molecules are more easily adjustable.

Accordingly, the present technology relates to a metallic electrode material further comprising an organic additive. This electrode material is generally in the form of a metallic film. The organic additive may be included on the surface of the metallic film or may be incorporated within the metallic film, or both on the surface and within the metallic film.

For instance, the organic molecule is an indigoid compound, such as an indigo blue or a derivative, leuco-indigo form, or salt thereof. In one embodiment, the compound is of Formula I, II or III:

wherein,
$R^1$, $R^2$, $R^3$, $R^4$, $R^5$, $R^6$, $R^7$, and $R^8$ are each independently selected from a hydrogen atom, a group selected from halogen (e.g. F, Cl or Br), optionally halogenated alkyl, cycloalkyl, or aryl, CN, —NO$_2$, —SO$_2$OM$^2$, —OP(O)(OM$^2$)$_2$, —P(O)(OM$^2$)$_2$, or —C(O)OM$^2$, wherein M$^2$ is a cation of an alkali or alkaline earth metal, or a —OC(O)alkyl, —SO$_2$NH$_2$, —SO$_2$NHalkyl, or —SO$_2$N(alkyl)$_2$ group;

X$^1$ is, independently in each occurrence, selected from O, S, NH, NR$^9$, and PH, wherein R$^9$ is selected from natural or synthetic carbohydrate and protective groups, for instance an amine protective group such as trifluoroacetamide, t-butyloxycarbonyl (Boc), benzyloxycarbonyl (Cbz), 9-fluorenylmethyloxycarbonyl (Fmoc), benzyl (Bn), and the like; and i. a, c and e are single bonds, b and d are double bonds, X$^2$ is O, and M$^1$ is H or a cation of an alkali or alkaline earth metal ion forming a salt with X$^2$ (e.g. M$^1$ is Li$^+$, Na$^+$, K$^+$, Ca$^{2+}$, or Mg$^{2+}$) wherein the ratio of cation to the rest of the compound of Formula I provides electroneutrality (e.g. M$^1$ may be Li$^+$ or (Mg$^{2+}$)$_{1/2}$); or ii. a, c and e are double bonds, b and d are single bonds, X$^2$ is O or NOH (oxime), and M$^1$ is absent;

or a geometric isomer (e.g. cis or trans) thereof, or a carbohydrate (mono or disaccharide, oligo and polysaccharides, e.g. β-D-glucose or cellulose) complex or conjugate thereof.

In one example, when c is a double bond, this double bond may have a cis or trans geometry. For instance, the c double bond is of trans geometry. In another example, X$^1$ is O, S or NH, preferably NH. In further examples, X$^2$ is O. In some examples of the compounds of Formula I, II or III, R$^1$ is identical to R$^5$, and/or R$^2$ is identical to R$^6$, and/or R$^3$ is identical to R$^7$, and/or R$^4$ is identical to R$^8$. In other examples, R$^1$ and R$^5$ are both hydrogen and/or R$^2$ and R$^6$ are both hydrogen atoms.

Other examples include compounds where at least one of R$^1$ to R$^8$ is selected from fluorine, cyano and trifluoromethyl. Alternatively, R$^1$, R$^4$, R$^5$ and R$^8$ are each hydrogen atoms, and R$^2$, R$^3$, R$^6$ and R$^7$ are as previously defined. In other examples, R$^1$, R$^4$, R$^5$ and R$^8$ are each hydrogen atoms, and R$^2$, R$^3$, R$^6$ and R$^7$ are independently selected from fluorine, cyano and trifluoromethyl.

In a further embodiment, M$^1$ is present and is selected from Li$^+$, Na$^+$ and K$^+$ For instance, M$^1$ is present and is Li$^+$.

The Indigo blue or derivative (where a, c and e are double bonds) as defined above may also be converted to its reduced form (where b and d are double bonds), for instance, by alkaline reduction. For instance, the reduced form of indigo blue is referred to as leuco-indigo or indigo white and may be in the form of a salt.

In another example, the organic molecule may also be an indigo precursor or derivative thereof, defined as a compound of Formula IV:

Formula IV wherein,

R$^1$, R$^2$, R$^3$, R$^4$, and X$^1$ are as previously defined; and

R$^{10}$ is a hydrogen atom or a carbohydrate, where the carbohydrate is a natural or synthetic carbohydrate (e.g. mono or disaccharide, oligo and polysaccharides, e.g. β-D-glucose or cellulose);

or a tautomer, oxidized form or salt thereof.

Examples of the compounds include those where R$^2$ is selected from halogen (e.g. F), optionally halogenated alkyl, —CN, and —SO$_2$OM$^2$, e.g. R$^2$ is —CN. Other examples include compounds with R$^1$ to R$^4$ are each a hydrogen atom. In some examples, R$^{10}$ is a hydrogen atom. Alternatively, R$^{10}$ is a carbohydrate, e.g. β-D-glucose or cellulose.

In one example, the compound is selected from the compounds of the formula:

Compound 1

(Indigo Blue)

Compound 2

(Li-Leuco-indigo)

Compound 3

Compound 4

Compound 5

Compound 6

Compound 7

Compound 8

(indigo carmine)

Compound 9

Compound 10

Compound 11

(indigopurpurin)

Compound 12

(isoindigo)

Compound 13

Compound 14

According to some examples, the compound is indigo blue or a derivative thereof having substituents on one or both aromatic rings. For example, one or more sulfonate groups (e.g. indigo carmine), one or more chlorine or bromine atoms (e.g. tyrian purple, ciba blue) or one or more nitrile groups. Other derivatives include the replacement of the amine groups by sulfur atoms in the cycles, i.e. wherein $X^1$ is S (e.g. thioindigo). In another example, the compound is indigo carmine. In yet another example, the compound is isoindigo. Another example of a compound is indigo purpurine. Another example of an indigoid compound is indolinedione (i.e. an oxidized form of the compound of Formula IV).

The compound as defined herein may also be in the form of a complex or conjugate, for instance, with a carbohydrate, e.g. a sugar or polysaccharide (such as cellulose).

Some of the compounds described herein may be available from commercial sources or may be prepared using known techniques, such as those described in Tanoue et al., Dyes and Pigments, 62, 2004, 101-105; Klimovich I. V., *J. Mat. Chem.*, 2014, 2, 7621-7631; Horn, R. H., et al., *Notes. Journal of the Chemical Society (Resumed)*, 1950, 2900-2908; Voß, G. and H. Gerlach, *Chemische Berichte*, 1989, 122(6), 1199-1201; Baltac, T., et al., *Revista de Chimie*, 2012, 63(6), 618-620; Bailey, J. E. and J. Travis, *Dyes and Pigments*, 1985, 6(2), 135-154; Leclerc, S., et al., *J. Biol. Chem.*, 2001, 276(1), 251-260; and Karapetyan G. et al., *Chem, Med. Chem.*, 2011, 6, 25-37, incorporated herein by reference in their entirety for all purposes.

In some implementations, the compound is comprised in (and/or on) the electrode material at low concentrations, for instance, a concentration of about 2 wt % or less, about 1 wt % or less, or between about 0.0001 wt % and about 1 wt %, or about 0.001% wt % and about 0.5 wt %.

For instance, the organic compound as defined herein may be used to improve ionic and/or electronic conductivity within the electrochemical cell and may be further included in the counter-electrode material.

Examples of metallic films in the electrode material can be selected from films of alkali or alkaline earth metals, and alloys thereof where an alkali or alkaline earth metal is the major component (at least 50%, at least 75%, at least 90%, at least 95%, or at least 99%), e.g. a film of metallic lithium, a lithium alloy (e.g. Li—Na, Li—Mg, Li—Zn, Li—Al and the like), sodium, a sodium alloy, magnesium, a magnesium alloy, etc. For instance, the metallic film is lithium or an alloy thereof having at least 95% or at least 99% lithium by weight (excluding the weight of organic compound as defined herein). In one example, the metallic film has a thickness between about 5 μm and about 200 μm, or between about 5 μm and about 100 μm, or between about 10 μm and about 50 μm.

The metallic films are generally prepared by extrusion or lamination, for instance, in a rolling process. The metallic film may be treated with the organic compound using any appropriate method. The metallic film may be treated with the organic compound before, during or after its preparation. For instance, a solution of the organic compound is applied as the formed metallic film comes out of the rolls. Alternatively, the organic compound solution is applied before its entry (or at the entry point) into the rolls used in the extrusion or lamination (rolling) process, it is or applied to the rolls before the lithium foil is passed therethrough. In this last alternative, the organic compound may be included in a lubricating composition. The organic compound may then be in solution in the lubricating composition used in the manufacture of metallic films, e.g. a lubricating polymer agent or solution of a polymer in an aprotic organic solvent such as an alkane solvent (e.g. hexane), an aromatic solvent (e.g. toluene) or a combination thereof. For instance, the lubricating polymer may comprise a polyether of a molecular weight sufficiently low to remain liquid. Examples of lubricating compositions and methods are found in international application number PCT/CA2015/050256, and U.S. Pat. Nos. 5,528,920, 5,837,401 and 6,019,801, the content of which is incorporated herein by reference for all purposes.

On example includes the application of a solution or mixture of the compound in a solvent, which is optionally removed after treatment. For instance, the solvent is an aprotic organic solvent inert to the metallic film. For example, the solvent may be an alkane (cyclic or acyclic) solvent, an ether (cyclic or acyclic) solvent, an aromatic organic solvent or a combination thereof, e.g. an alkane such as hexane, heptane, or a cyclic ether such as tetrahydrofuran, and the like. The process may also further include a step of washing with an additional portion of solvent to remove excess organic compound. Application of the compound may be carried out in any known compatible method, for instance, by drop-casting, mold casting, dip coating, spin coating, spray coating, printing, slot die coating, doctor blade coating, chemical vapor deposition, physical vapor deposition, and the like. Application methods such as by chemical vapor deposition methods and physical vapor deposition methods, where the compound may not have to be dissolved in a solvent, are also contemplated.

The extrusion or lamination step may also be part of a multistep process comprising the further application of the treated metallic film to a current collector and/or solid polymer electrolyte film or an electrolyte separator film. These steps may be carried in a continuous, roll to roll process and optionally include additional steps (e.g. to combine with other components of an electrochemical cell).

Also contemplated is the manufacture of present electrode material by processes similar to those used in the preparation of alloys. For instance, the organic compound is introduced in a molten alkali or alkaline earth metal before or after casting in a mold. The melted metal is then allowed to cool and solidify to form an ingot, which is afterward extruded and optionally laminated to form a film. This method may be appropriate when temperatures and conditions used allow for the organic material and metal to remain intact while providing an at least partial insertion of the organic compound within the metallic material.

The electrode material comprising the metallic film treated with the organic compound has no passivation layer or further includes a thin, uniform and stable passivation layer.

The present technology further relates to an electrode comprising a film of the electrode material on a current collector (e.g. Cu, Ni). For instance, the electrode is for use in a lithium, sodium or magnesium battery, e.g. a lithium battery. The organic compound may contribute as an electron conductive agent, as an ion diffusing agent and/or as an overcharge protector. For instance, the presence of the organic compound described herein may result in increased battery capacity and/or reduced internal resistance.

Generally, the electrodes as herein defined are for use in the preparation of electrochemical cells further comprising a counter-electrode and an electrolyte. As such, the present electrode in an electrochemical cell may serve as a negative or positive electrode depending on the counter-electrode material used and/or on the batterie being in charge or discharge mode.

Examples of counter-electrode materials include particles of electrochemically active material such as metal oxides and complex oxides, lithium metal oxides and complex oxides, metal phosphates and lithium metal phosphates. Examples of counter-electrode electrochemically active materials include, without limitation, lithium metal phosphates (e.g. $LiM'PO_4$ where M' is Fe, Ni, Mn, Co, ora combination thereof), vanadium oxides (e.g. $LiV_3O_8$, $V_2O_5$, $LiV_2O_5$, and the like), and other lithium metal oxides such as $LiMn_2O_4$, $LiM"O_2$ (M" being Mn, Co, Ni, or a combination thereof) and $Li(NiM''')O_2$ (M''' being Mn, Co, Al, Fe, Cr, Ti, Zr, and the like, or a combination thereof), as well as delithiated forms of the above lithium metal oxides and phosphates, organic electrochemically active cathode materials, sulfur, air (oxygen), or a combination thereof, or any of the above materials further comprising a compatible doping element selected from Groups 2 to 15 of the periodic table of elements. For instance, the counter-electrode active material is selected from lithium iron phosphate (LFP), lithium manganese iron phosphate (LMFP), and lithium nickel manganese cobalt oxide (NMC).

According to another example, the counter-electrode electrochemically active material is of the formula $LiM'PO_4$ wherein M' is Fe, Ni, Mn, Co or a combination thereof optionally doped with a compatible element, for instance optionally doped with an element selected from Mg, Al, B, Ti, V, Cr, Cu, Zn, Mo, Sn, Ca, Sr and W, or a combination thereof. For instance, the electrochemically active material is $LiFePO_4$ or $LiMn_xFe_{1-x}PO_4$, where $0<x<1$, optionally doped with a compatible element, for instance, optionally doped with an element selected from Co, Ni, Mg, Al, B, Ti, V, Cr, Cu, Zn, Mo, Sn, Ca, Sr and W, or a combination thereof, for instance optionally doped with magnesium. Examples of counter-electrode electrochemically active materials also include compounds of the formula $LiM"O_2$, wherein M" is Mn, Co, Ni, or a combination thereof. For instance, the counter-electrode electrochemically active material is $LiNi_wMn_yCo_zO_2$, where $w+y+z=1$.

The counter-electrode electrochemically active material particles are freshly formed or of commercial source. They may be in the form of microparticles or nanoparticles and may further include a carbon coating.

The counter-electrode material optionally includes additional components like electronically conductive materials, inorganic particles, glass or ceramic particles, salts (e.g. lithium salts), and the like. Examples of electronically conductive materials include carbon black, Ketjen™ black, acetylene black, graphite, graphene, carbon fibers or nanofibers (e.g. VGCF) or nanotubes, or a combination thereof. In another example, the counter-electrode material as defined above may also further comprise an organic compound as defined herein.

The counter-electrode material may further comprise at least one binder. Examples of binders include water soluble binders such as SBR (styrene butadiene rubber), NBR (butadiene acrylonitrile rubber), HNBR (hydrogenated NBR), CHR (epichlorohydrin rubber), ACM (acrylate rubber), and the like, and cellulose-based binders (e.g. carboxyalkylcellulose, hydroxyalkylcellulose, and combinations), or any combination of two or more of these. For instance, the carboxyalkylcellulose may be carboxymethylcellulose (CMC) or carboxyethylcellulose. Hydroxypropylcellulose is an example of hydroxyalkylcellulose. Other examples of binders include fluorine-containing polymeric binders such as PVDF and PTFE, and ion-conductive polymer binders such as block copolymers composed of at least one lithium-ion solvating segment and at least one cross-linkable segment. For instance, the binder is a polyether-type polymer such as those based on poly(ethylene oxide) (PEO), which may further include crosslinkable moieties. In one embodiment, the binder comprises a water-soluble binder and a cellulose-based binder, for example, a combination of SBR and CMC.

The counter-electrode material is usually coated on a substrate film, e.g. a current collector. The counter-electrode material may be coated as a slurry on the substrate film in continuous mode by various methods, such as the comma bar method, the doctor blade method or by slot die casting.

The electrolyte may be a liquid, gel or solid polymer electrolyte and, in the case of a lithium or lithium-ion battery, comprises a lithium salt and/or is conductive to lithium ions. Non-limiting examples of liquid electrolytes include organic liquid electrolytes comprising a polar aprotic solvent such as ethylene carbonate (EC), diethyl carbonate (DEC), propylene carbonate (PC), dimethyl carbonate (DMC), ethyl methyl carbonate (EMC), γ-butyrolactone (γ-BL), vinyl carbonate (VC), et mixtures of two or more thereof, and a salt of the alkali or alkaline earth metal. Other examples of compatible liquid electrolytes include molten salts electrolytes. A separator may also be impregnated with the liquid electrolyte, for instance, a polymer separator (e.g., a polypropylene, polyethylene, or a propylene and ethylene copolymer).

Gel electrolytes generally comprise a compatible polymer and a salt, optionally further comprising a solvent and/or a separator. Exemplary gel electrolytes include those described in PCT publication numbers WO2009/111860 (Zaghib et al.) and WO2004/068610 (Zaghib et al.).

Solid polymer electrolytes (SPE) may generally comprise one or more solid polar polymers, optionally cross-linked, and a salt. Polyether-type polymers such as those based on poly(ethylene oxide) (PEO) may be used, but several other compatible polymers are also known for the preparation of SPEs. The polymer may also be further crosslinked. Examples of such polymers include star-shaped or comb-shaped multi-branch polymers such as those described in PCT publication number WO2003/063287 (Zaghib et al.).

Figure 1:
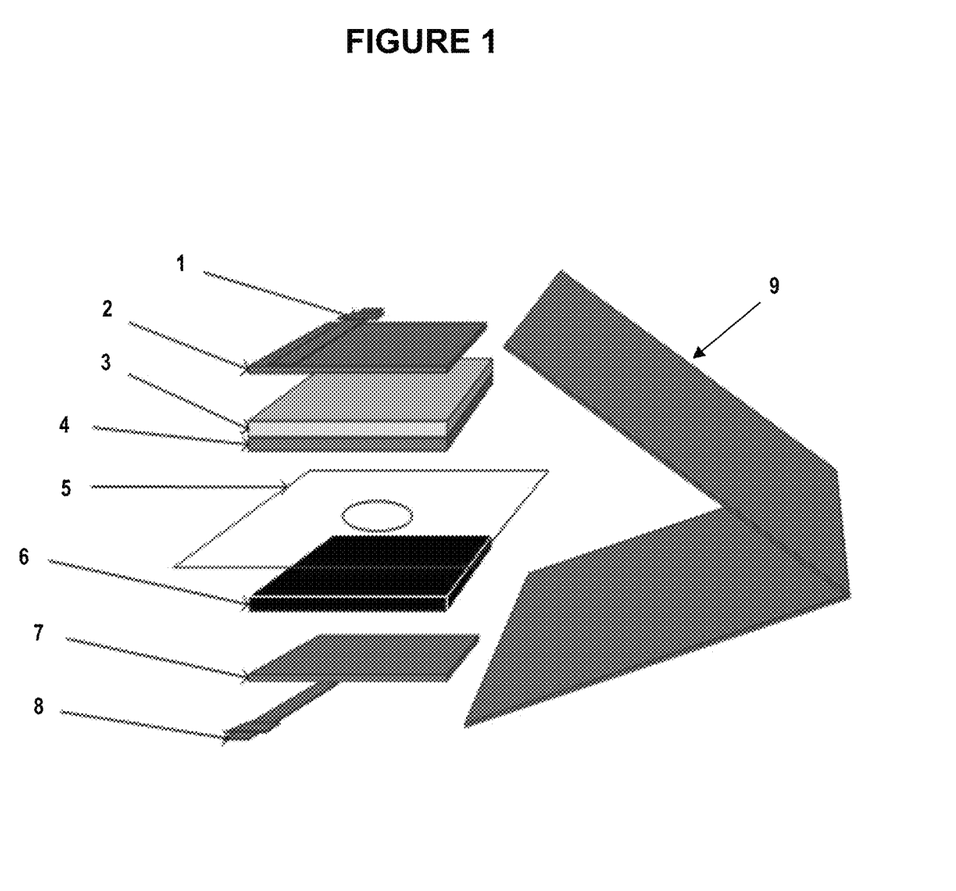
FIG. 1 is an exploded view of an example of an all solid lithium battery assembly.

FIG. 1 illustrates an exploded view of a configuration for a solid-state lithium battery according to one of the present embodiments. In this configuration, the following elements are stacked: nickel current collector (1) equipped with a nickel tab (2), anode Li-indigo electrode material film (3), solid polymer electrolyte (4), mask (5), cathode material film (6), and aluminum current collector (7) equipped with an aluminum tab (8). The stacked layers are placed in a metallic plastic pouch (9) or any other type of battery shell, and sealed.

The present technology therefore also further relates to electrochemical cells comprising the present electrode, a counter electrode and an electrolyte. For instance, the electrochemical cell may be used in capacitors or supercapacitors, or in alkali or alkaline earth metal batteries such as lithium, sodium or magnesium batteries, e.g. lithium batteries.

EXAMPLES

The following non-limiting examples are illustrative embodiments and should not be construed as further limiting the scope of the present invention. These examples will be better understood with reference to the accompanying figures.

Example 1: Preparation of Treated Metallic Films a) Preparation of a Treated Lithium Film (Li-1, Without Washing)

An extruded lithium metal film (40 μm) was used. A saturated solution of indigo blue (Compound 1) was prepared in 10 mL of hexanes (8 mg indigo per 15 g). Without any filtration, the liquid phase was drop-casted on the lithium film. The solvent was evaporated to leave a film on the lithium surface comprising indigo blue in colorless form and some colored indigo blue. The treated lithium film (Li-1) was used as obtained.

b) Preparation of a Treated Lithium Film (Li-2, With Washing)

As in (a), an extruded lithium metal film (40 μm) was used. A saturated solution of indigo blue (Compound 1) was prepared in 10 mL of hexanes. Without any filtration, the liquid phase was drop-casted on the lithium film. The solvent was evaporated, and the lithium surface was washed three times with hexanes. The washing step removed the remaining colored indigo blue. The treated lithium film (Li-2) was used as obtained.

c) Preparation of a Treated Lithium Film (Li-3, by Lamination)

A treated lithium alloy (0.2 wt % Al) film is prepared by a method such as that described in Example 2 of U.S. Pat. No. 5,528,920 with the exception that indigo blue (Compound 1) is added to the lubricant (tetrahydrofuran) at a concentration of about 0.003 wt %. The extruded Li—Al alloy of 250 micrometers thick was tinned down to 42 micrometers by passing it between two laminating stainless steel rollers at an approximate speed of 1 m/min.

d) Preparation of a Treated Lithium Film (Li-4, by Mold Casting)

An extruded lithium metal film (40 μm) was used. A saturated solution of indigo blue (Compound 1) was prepared in THF (tetrahydrofuran) and filtered. The Li metal film was placed in a stainless-steel mold (having internal dimensions of 9.2 cm×6.7 cm×1.6 cm, L×W×H). The filtered indigo saturated THF solution was applied on the Li metal contained in the stainless-steel mold. The solvent was evaporated to leave a film on the lithium surface comprising indigo blue in colorless form and some colored indigo blue. The treated lithium film (Li-4) was used as obtained.

e) Preparation of a Treated Lithium Film (Li-5, Without Washing)

An extruded lithium metal film (40 μm) was used. A saturated solution of indigo blue (Compound 1) was prepared in THF and filtered. The solution was drop-casted on the lithium film. The solvent was evaporated to leave a film on the lithium surface comprising indigo blue in colorless form and some colored indigo blue. The treated lithium film (Li-5) was used as obtained.

Example 2: Preparation of Exemplary Electrochemical Cells a) Preparation of Counter-Electrodes:
a.1—The cathode material was prepared by mechanically mixing carbon coated LiFePO$_4$ (65 wt %, LCP420M, Sumitomo Osaka Cement Co., Ltd.), Ketjen™ Black (2.5 wt %, ECP600), carbon fibers (2.5 wt %, VGCF-H), LiTFSI (7.4 wt %) and a PEO-based crosslinkable polymer (22.6 wt %) in Ethanol/H$_2$O (80/20). The resulting viscous slurry was cast uniformly on an aluminium foil serving as current the collector. The cathode material contains 64.97 wt % of active material and a loading of 10.13 mg/cm$^2$.
a.2—The cathode material was prepared by mechanically mixing carbon coated LiFePO$_4$ (58.24 wt %, LCP420M, Sumitomo Osaka Cement Co., Ltd.), Denka™ Black (10.24 wt %, HS100), carbon fibers (3.06 wt %, VGCF-H), LiFSI (3.50 wt %) and a PEO-based crosslinkable polymer (24.96 wt %) in Ethanol/H$_2$O (80/20). The resulting viscous slurry was cast uniformly on an aluminium foil serving as current the collector. The cathode material contains 58.24% of active material and a loading of 3.70 mg/cm$^2$.

b) Preparation of the Electrolyte:
The electrolyte used in the cells tested comprised a PEO-based crosslinkable polymer (200 g), LiTFSI (65.25 g), acetonitrile (492 mL), toluene (123 mL) and Irgacure™ 651 (0.4 g). The polymer mixture was coated on a substrate and crosslinked before removing the substrate.

c) Composition of Cells Prepared:
The following cells were assembled in a plastic pouch and sealed:

Cell 1:
  Anode: Li-1 on a nickel current collector
  Solid polymer electrolyte as defined in Example 2(b)
  Cathode: LFP cathode prepared as in Example 2(a.1) on an aluminum current collector.

Cell 2:
  Anode: Li-2 on a nickel current collector
  Solid polymer electrolyte as defined in Example 2(b) above
  Cathode: LFP cathode prepared as in Example 2(a.1) on an aluminum current collector.

Cell 3 (Reference):
  Anode: Li (40 μm) on a nickel current collector
  Solid polymer electrolyte as defined in Example 2(b) above
  Cathode: LFP cathode prepared as in Example 2(a.1) on an aluminum current collector.

Cell-4:
  Anode: Li-3 (Li—Al 0.2%) on a nickel current collector
  Solid polymer electrolyte as defined in Example 2(b)
  Cathode: LFP cathode prepared as in Example 2(a.1) on an aluminum current collector.

Cell-5 (Reference):
  Anode: Li—Al 0.2% (40 μm) on a nickel current collector
  Solid polymer electrolyte as defined in Example 2(b) above
  Cathode: LFP cathode prepared as in Example 2(a.1) on an aluminum current collector.

Cell-6:
  Anode: Li-4 on a nickel current collector
  Solid polymer electrolyte as defined in Example 2(b)
  Cathode: LFP cathode prepared as in Example 2(a.2) on an aluminum current collector.

Cell-7:
  Anode: Li-5 on a nickel current collector
  Solid polymer electrolyte as defined in Example 2(b)
  Cathode: LFP cathode prepared as in Example 2(a.2) on an aluminum current collector.

Cell-8 (Reference):
  Anode: Li (40 μm) on a nickel current collector
  Solid polymer electrolyte as defined in Example 2(b) above
  Cathode: LFP cathode prepared as in Example 2(a.2) on an aluminum current collector.

Example 3: Electrochemical Properties a) Electrochemical Performance:
Prior to the cycling test, batteries were charged and discharged twice at C/24 at 80° C., where xC is the current that can fully charge/discharge cell capacity in 1/x hour. Charge in CC-CV (Constant current constant voltage) mode, discharge in CC mode.

The effective capacity was evaluated at (1 C) 155 mAh/g for LFP. The voltage used varied between 3.65V and 2.0 volt in discharge. Long term cyclings were performed at C/3. Cycling was done at 80° C. on a VMP-300.

Figure 2:
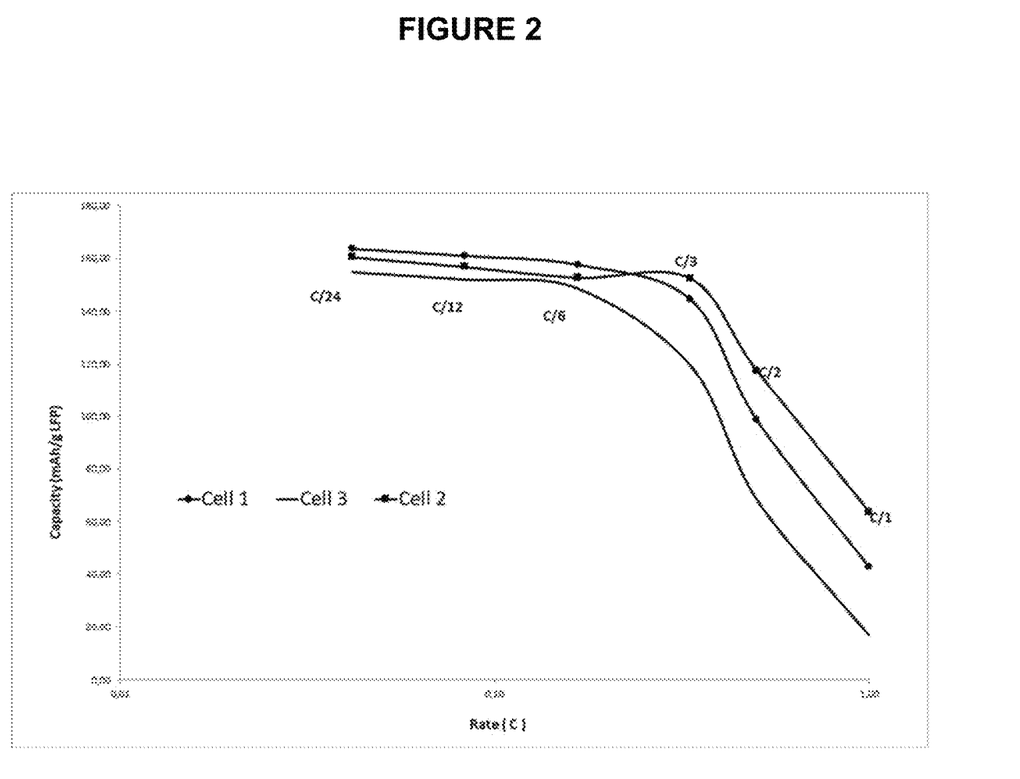
FIG. 2 shows the load test results expressed as the variation in capacity as a function of the C rate for Cells 1, 2 and 3 (reference) as defined in Example 2(c).

The load test results for Cells 1, 2 and 3 defined in Example 2 are shown in FIG. 2. These were completed at rates of C/24, C/12, C/6, C/3, C/2 and C/1. Improved capacities were observed for indigo treated lithium Cells 1 and 2 (circles and squares respectively) when compared to the non-treated lithium Cell 3 (plain line). Capacity of Cell 2 is also slightly better than that of Cell 1 at rates of C/3, C/2 and C/1.

Figure 3:
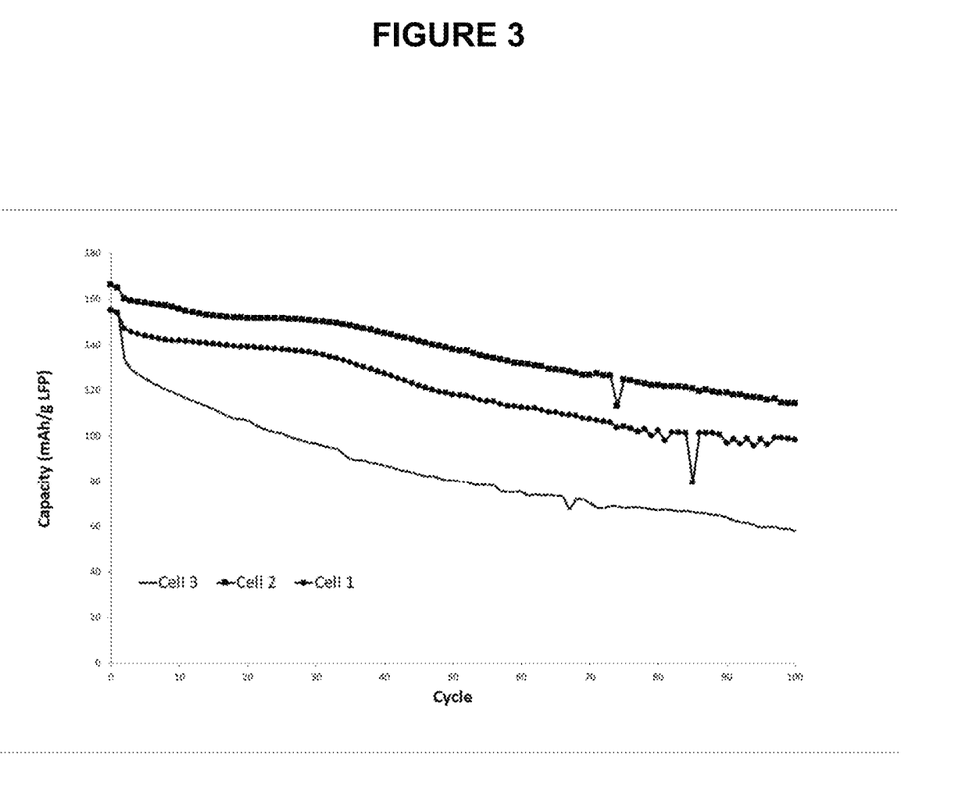
FIG. 3 shows the discharge capacity for Cells 1, 2 and 3 (reference) as defined in Example 2(c).

FIG. 3 shows the discharge capacity results for Cells 1, 2 and 3 for up to 100 cycles. Results demonstrate a clear improvement for Cells 1 and 2 containing indigo-treated lithium anodes, compared to Cell 3 which contains untreated lithium. An improvement in discharge is also observed when comparing Cell 2 (squares) to Cell 1 (circles).

It is hypothesized that the washing steps included in the preparation of Li-2 removes the excess indigo on the surface, which improves the SPE/lithium interface.

Figure 5:
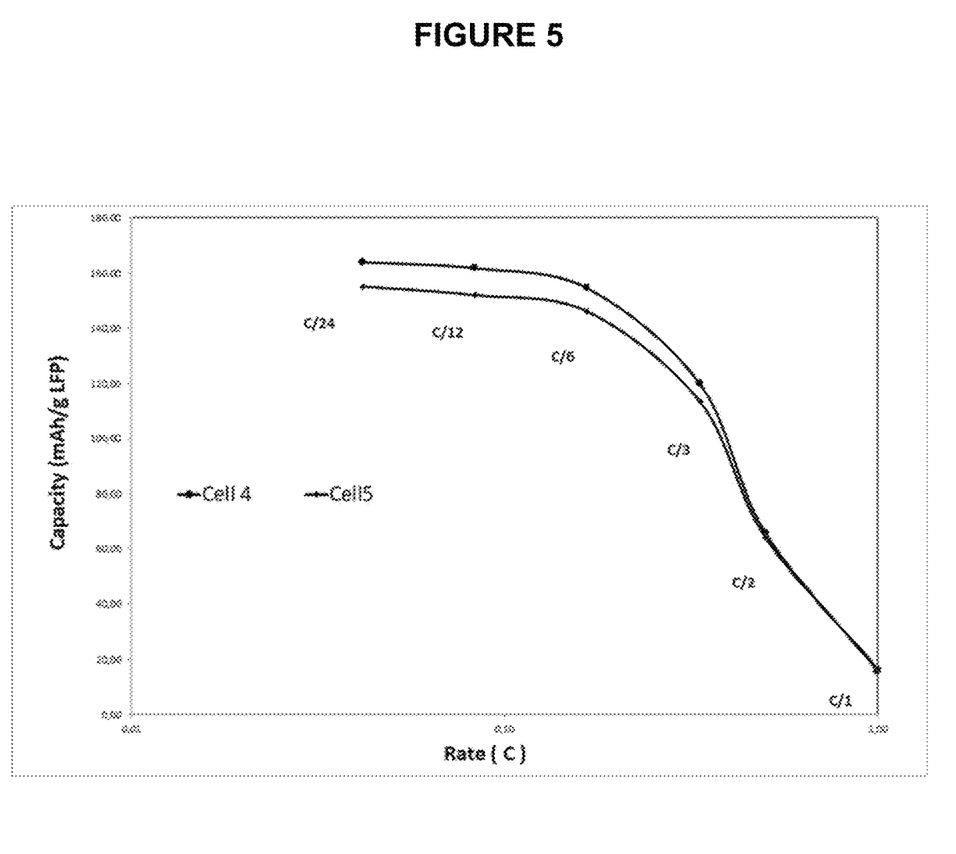
FIG. 5 shows the load test results expressed as the variation in capacity as a function of the C rate for Cells 4 and 5 (reference) as defined in Example 2(c).

The load test results for Cells 4 and 5 defined in Example 2 are shown in FIG. 5. These were completed at rates of C/24, C/12, C/6, C/3, C/2 and C/1. Improved capacities were observed for indigo treated lithium Cell 4 (circles) when compared to the non-treated lithium Cell 5 (diamonds) at rates of C/24, C/12, C/6 and C/3.

Figure 6:
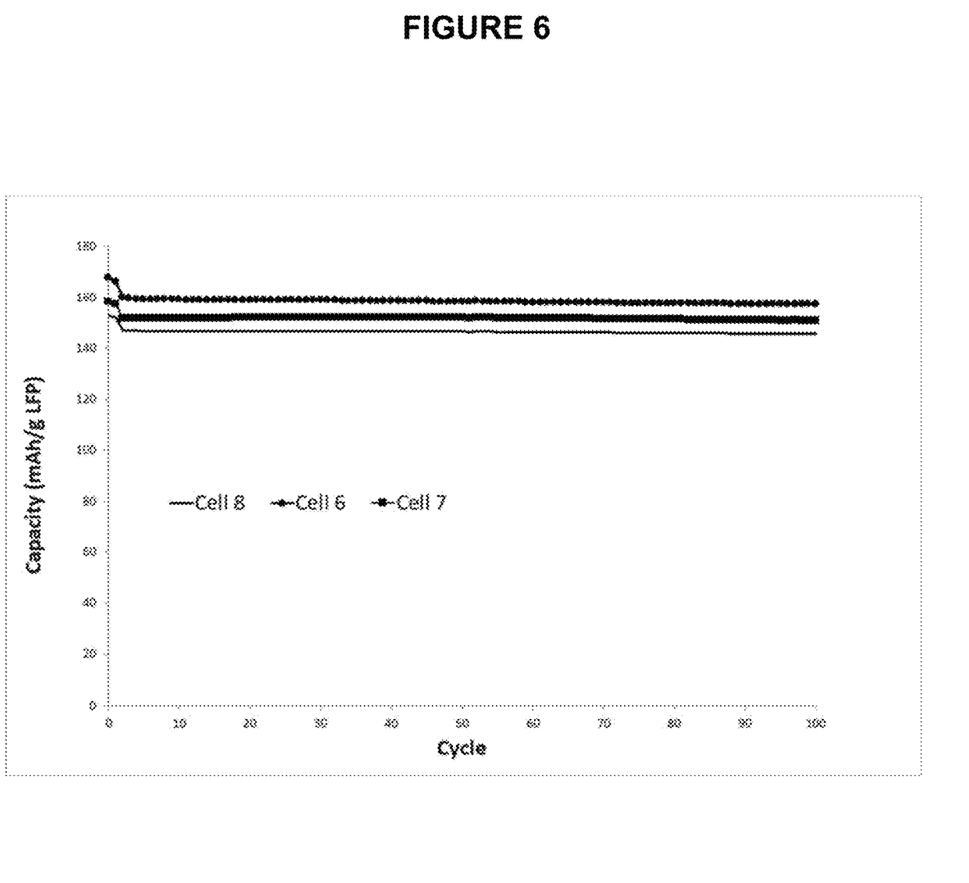
FIG. 6 presents the discharge capacity results for up to 100 cycles for Cells 6, 7, and 8 (reference) as defined in Example 2(c).

FIG. 6 shows the discharge capacity results for Cells 6, 7 and 8 for up to 100 cycles. Results demonstrate a clear improvement for Cells 6 and 7 containing indigo-treated lithium anodes, compared to Cell 8 which contains untreated lithium. An improvement in discharge is also observed when comparing Cell 6 (circles) to Cell 7 (squares).

b) Electrochemical Impedances:
Electrochemical impedance tests were also performed using LFP-Li Cells 1, 2 and 3 described in Example 2 using the long-term cycling conditions (C/3) of Example 3(a). Impedance associated with lithium itself and with the solid electrolyte interphase (SEI) of the lithium electrode were measured for each cell before formation, after formation and every 50 cycles for up to 200 cycles for Cells 1 and 2 and for up to 150 cycles for Cell 3.

Figure 4:
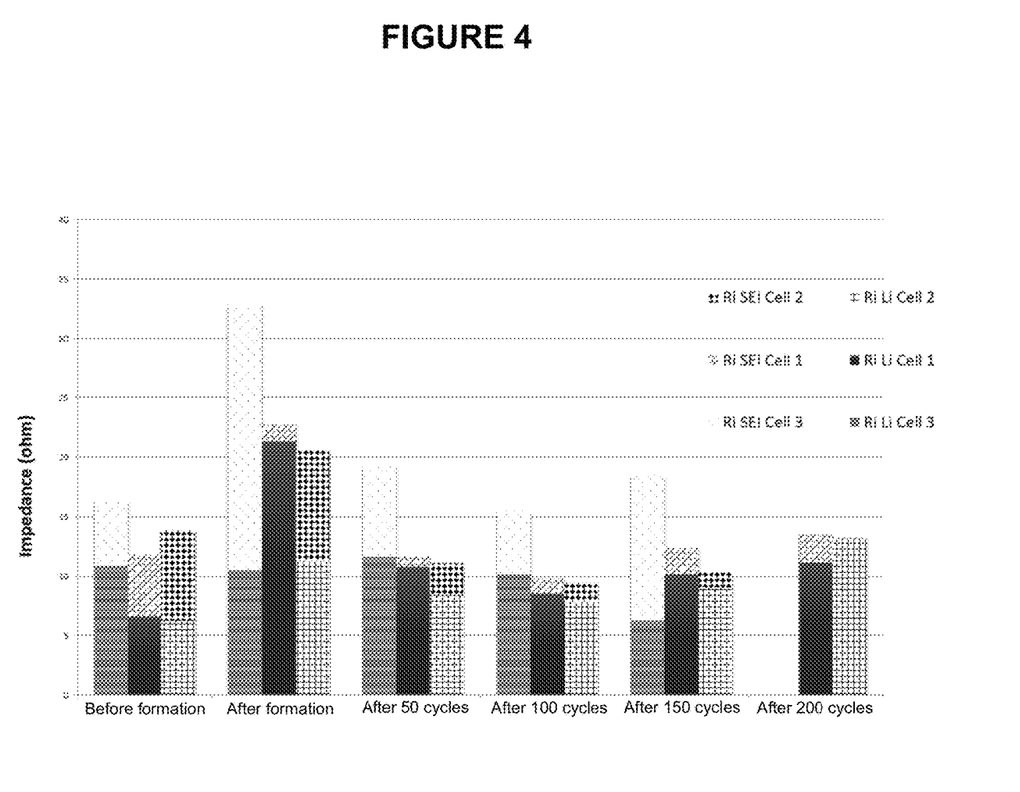
FIG. 4 shows the impedance results for the SEI (solid electrolyte interphase) and lithium film itself before formation, after formation, and every 50 cycles for Cells 1, 2 and 3 (reference) as defined in Example 2(c) (untreated lithium (Cell 3) alone not tested at 200 cycles).

FIG. 4 shows the impedance results for the three cells. Generally, resistance of the SEI becomes more important as cycling occurs (as the SEI forms on the Li surface while salts and SPE degrades). In the present case, addition of the indigo layer at the surface limits the resistance associated with SEI since indigo at least partly prevents its formation. In other words, indigo would protect the electrolyte from metallic lithium.

Numerous modifications could be made to any of the embodiments described above without departing from the scope of the present invention. Any references, patents or scientific literature documents referred to in this document are incorporated herein by reference in their entirety for all purposes.

The invention claimed is:

1. An electrode material comprising a film of a metallic material as electrochemically active material, and a compound of any one of Formulae I to IV:

Formula I

Formula II

Formula III

Formula IV wherein, $R^1$, $R^2$, $R^3$, $R^4$, $R^5$, $R^6$, $R^7$, and $R^8$ are each independently selected from a hydrogen atom, a group selected from halogen, optionally halogenated alkyl, cycloalkyl, or aryl, CN, —$NO_2$, —$SO_2OM^2$, —$OP(O)(OM^2)_2$, —$P(O)(OM^2)_2$, or —$C(O)OM^2$, wherein $M^2$ is a cation of an alkali or alkaline earth metal, or a —OC(O)alkyl, —$SO_2NH_2$, —$SO_2NHalkyl$, or —$SO_2N(alkyl)_2$ group;

$R^{10}$ is a hydrogen atom or a carbohydrate, wherein the carbohydrate is a natural or synthetic mono or disaccharide, oligo or polysaccharides;

$X^1$ is, independently in each occurrence, selected from O, S, NH, $NR^9$, and PH, wherein $R^9$ is selected from natural or synthetic carbohydrate and an amine protective group; and i. a, c and e are single bonds, b and d are double bonds, $X^2$ is O, and $M^1$ is H or a cation of an alkali or alkaline earth metal ion forming a salt with $X^2$ wherein the ratio of cation to the rest of the compound of Formula I, II, or III provides electroneutrality; or ii. a, c and e are double bonds, b and d are single bonds, $X^2$ is O or NOH(oxime), and $M^1$ is absent;

a geometric isomer of a compound of Formula I, II or III, or a tautomer, oxidized form or salt of a compound of Formula IV;

or a carbohydrate complex or conjugate thereof; and wherein the metallic material is selected from an alkali or alkaline earth metal, and alloys thereof where the alkali or alkaline earth metal is the major component.

2. The electrode material of claim 1, wherein $X^1$ is O, S or NH.

3. The electrode material of claim 2, wherein $X^1$ is NH.

4. The electrode material of claim 1, wherein the compound is of Formula I, Formula II, or Formula III.

5. The electrode material of claim 4, wherein $R^2$ and $R^6$ are the same and selected from halogen, optionally halogenated alkyl, —CN, and —$SO_2OM^2$; and/or $R^3$ and $R^7$ are the same and selected from halogen, optionally halogenated alkyl, —CN, and —$SO_2OM^2$.

6. The electrode material of claim 4, wherein each of $R^1$ to $R^8$ are each a hydrogen atom.

7. The electrode material of claim 4, wherein a, c and e are single bonds, b and d are double bonds, $X^2$ is O, and $M^1$ is H or a cation of an alkali or alkaline earth metal ion forming a salt with $X^2$.

8. The electrode material of claim 7, wherein $M^1$ is a cation of the same metal as the metal of the film of metallic material.

9. The electrode material of claim 4, wherein a, c and e are double bonds, b and d are single bonds, $X^2$ is O, and $M^1$ is absent.

10. The electrode material of claim 1, wherein the compound is of Formula IV, wherein $R^2$ is selected from halogen, optionally halogenated alkyl, —CN, and —$SO_2OM^2$, or wherein each of $R^1$ to $R^4$ are each a hydrogen atom.

11. The electrode material of claim 10, wherein $R^{10}$ is a hydrogen atom.

12. The electrode material of claim 10, wherein $R^{10}$ is β-D-glucose or cellulose.

13. The electrode material of claim 1, wherein the compound is selected from:

14. The electrode material of claim 1, wherein the compound is selected from indigo blue, indigo carmine, isoindigo, indigopurpurin, indolinedione, and leuco-indigo, or a $M^1$ salt thereof.

15. The electrode material of claim 1, wherein the metallic film is a film of an alkali or alkaline earth metal.

16. The electrode material of claim 1, wherein the metallic film is a film of lithium or a lithium alloy comprising at least 75% of lithium by weight.

17. The electrode material of claim 1, wherein the metallic film has a thickness between 5 µm and 200 µm.

18. The electrode material of claim 1, wherein said compound is at a concentration of 2 wt % or less relative to the electrode material.

19. A process for producing an electrode material as defined in claim 1, comprising the steps of:
   a) mixing the compound in a solvent to obtain a mixture, the solvent being an organic aprotic inert solvent;
   b) applying the mixture obtained in step (a) on the metallic film to form a treated film; and
   c) removing the solvent to afford a film of the electrode material.

20. The process of claim 19, wherein the organic aprotic inert solvent is an alkane solvent, an ether solvent, an aromatic solvent, or a combination thereof.

21. The process of claim 19, further comprising a step (d) of washing the film of the electrode material of step (c) with a washing solvent.

22. The process of claim 19, wherein step (b) is performed by drop-casting, mold casting, dip coating, spin coating, spray coating, printing, slot die coating, doctor blade coating, chemical vapor deposition, or physical vapor deposition.

23. A process for producing an electrode material as defined in claim 1, comprising the steps of:
   a) mixing the compound in a lubricating agent to obtain a lubricating composition;
   b) applying the lubricating composition obtained in step (a) on a metallic foil of the metallic material to form a treated foil; and
   c) extruding between at least two rolls the treated foil obtained in step (b).

24. The process of claim 23, wherein steps (b) and (c) are carried out simultaneously.

25. The process of claim 23, wherein the lubricating agent comprises a polymer.

26. The process of claim 23, wherein the lubricating agent comprises a solvent, the solvent being an organic aprotic inert solvent.

27. The process of claim 26, further comprising a step (d) of removing the solvent.

28. The process of claim 23, wherein the compound is at a concentration of between 0.001 wt % and 2 wt % in the lubricating composition.

29. A process for producing an electrode material as defined in claim 1, comprising the steps of:
   a) melting an alkali metal or an alloy thereof to obtain a molten metal;
   b) mixing the compound with the molten metal, casting and allowing to solidify to form an ingot, wherein said mixing and casting may be carried out in any order; and
   c) extruding between at least two rolls the ingot obtained in (b) into a film to be used as electrode material.

30. An electrode comprising an electrode material as defined in claim 1 on a current collector.

31. An electrochemical cell comprising an electrode containing an electrode material as defined in claim 1, an electrolyte and a counter-electrode.

32. A battery comprising at least one electrochemical cell as defined in claim 31.

\* \* \* \* \*